United States Patent [19]

Bando et al.

[11] Patent Number: 5,435,938
[45] Date of Patent: Jul. 25, 1995

[54] CATHODE-RAY TUBE FLUORESCENT MATERIAL AND ITS METHOD OF MANUFACTURE

[75] Inventors: Shoichi Bando, Myozai; Yoshikatsu Aihara, Anan, both of Japan

[73] Assignee: Nichia Chemical Industries, Ltd., Tokushima, Japan

[21] Appl. No.: 208,303

[22] Filed: Mar. 10, 1994

[30] Foreign Application Priority Data

Mar. 11, 1993 [JP] Japan ................................. 5-050433

[51] Int. Cl.$^6$ .............................................. C09K 11/08
[52] U.S. Cl. ...................... 252/301.4 S; 252/301.4 R; 252/301.6 S; 427/64; 427/68
[58] Field of Search .................. 252/301.4 R, 301.4 S, 252/301.6 S; 427/64, 68

[56] References Cited

U.S. PATENT DOCUMENTS 2,651,584  9/1953  Longini et al. ................ 252/301.6 S
5,145,743  9/1992  Beutel et al. .................. 252/301.4 S

FOREIGN PATENT DOCUMENTS 453685  10/1991  European Pat. Off. ...... 252/301.4 R

Primary Examiner—Mark L. Bell
Assistant Examiner—C. M. Bonner
Attorney, Agent, or Firm—Wenderoth, Lind & Ponack

[57] ABSTRACT

Electrolytes are attached to fluorescent particle surfaces to prevent open spots in cathode-ray tube coatings dried at high temperatures. Electrolytes that are sulfates, nitrates, or chlorides of alkali or alkaline-earth metals are added to a liquid suspension of fluorescent particles which have passed through a cleaning step. Electrolytes are added to the suspension to make the conductivity of the clear top liquid greater than 30 $\mu\Omega^{-1}$ cm$^{-1}$. The fluorescent particle preparation process is finished with a final dehydration and drying step.

20 Claims, 3 Drawing Sheets

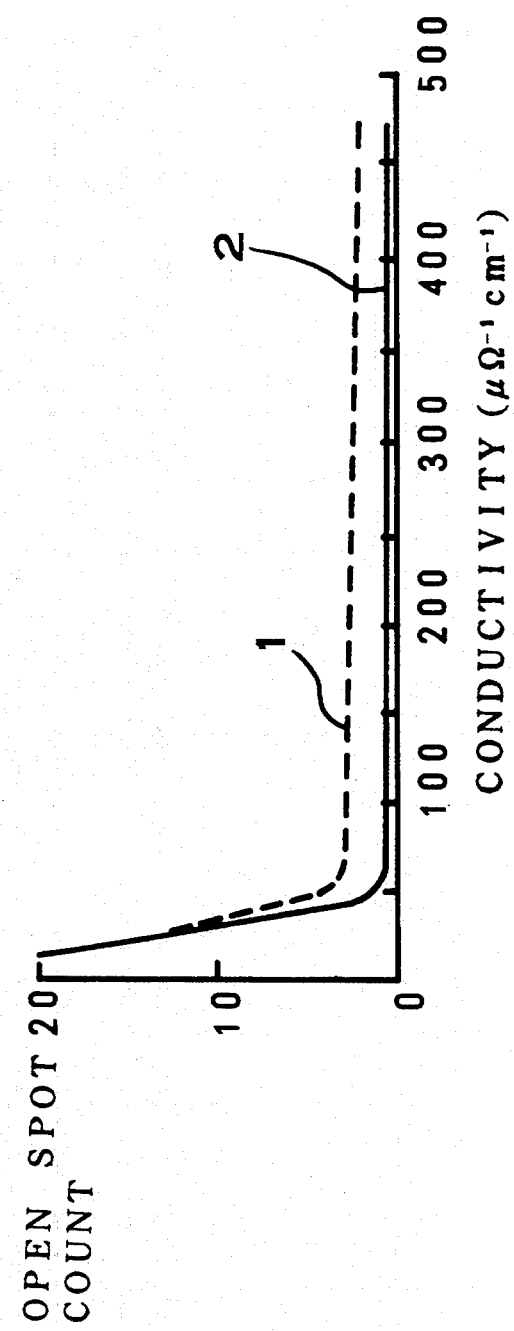

CATHODE-RAY TUBE FLUORESCENT MATERIAL AND ITS METHOD OF MANUFACTURE

BACKGROUND OF THE INVENTION

This invention relates to a Cathode-Ray Tube (CRT) fluorescent material and its method of manufacture wherein the surface properties of the fluorescent material are modified, while maintaining fluorescent functionality, to allow uniform fluorescent material film formation during CRT face-plate coating.

Various coating methods have been developed for forming a fluorescent material coating on the face-plate of a color CRT. Among them, the slurry method is the most often used. In the slurry method, a face-plate is coated with a fluorescent film as follows. Ammonium dichromate (ADC) or like substance is added to an aqueous solution of fluorescent material particles and polyvinyl alcohol (PVA) to make a fluorescent material suspension (slurry). The inner surface of the face-plate is coated with this fluorescent material suspension. The coated surface is then exposed to ultra-violet light through a shadow-mask causing the exposed areas to oxidize and harden. Since the unexposed fluorescent material particles do not react, they are sprayed off with water to develop the surface. In this fashion a prescribed fluorescent pattern is formed on the face-plate.

In the slurry method, the entire panel including the face-plate was traditionally heated to about 38° C. to 40° C. Recently, in order to increase production by reducing drying time after exposure and development, it has become common to dry the panel including the face-plate by heating it to the high temperature of 55° C. to 60° C. during the drying step.

However, by drying the fluorescent coating at these high temperatures, local thining of the fluorescent material and open spots occur more frequently in the coating resulting in a reduction in production yield. Therefore, fluorescent material particles with modified surfaces, that allow a uniform fluorescent coating to be formed without open spots even when the panel is dried at the high temperature of 55° C. to 60° C. and maintain fluorescent functionality, have long been sought.

The present inventors discovered that the above mentioned problems could be solved by attaching large quantities of electrolytes, which are sulfates, nitrates, or chlorides of alkali metals or alkaline-earth metals, to the fluorescent particles, rather than by methods of forming a fluorescent coating such as adding small amounts of aqueous zinc sulfate solution to the fluorescent material slurry in the slurry method disclosed, for example, by Japanese Non-examined Patent Publication No. 52-67569 issued Jun. 4, 1977. The present invention was completed as a result of this earnest research.

Consequently, the object of this invention is to provide a CRT fluorescent material and its method of manufacture wherein fluorescent particle surfaces are modified, while maintaining fluorescent functionality, to allow formation of a uniform CRT face-plate fluorescent coating, even when it is dried at panel temperatures of 55° C. to 60° C.

SUMMARY OF THE INVENTION

The CRT fluorescent material of this invention is produced by adding an electrolyte, which are sulfates, nitrates, or chlorides of alkali or alkaline-earth metals, to a liquid suspension containing fluorescent material particles which have gone through a cleaning process step. The electrolytes are added to the fluorescent material suspension until the clear top liquid (supernatant) has a conductivity greater than or equal to 30 $\mu\Omega^{-1}$ cm$^{-1}$. The fluorescent material suspension subsequently goes though dehydration and drying to yield fluorescent material with electrolytic material attached to the surfaces of the fluorescent particles.

It is preferable to process the CRT fluorescent material of this invention with an oxidizing agent by adding an alkali hydroxide and an oxidizing agent in the cleaning process step and including a subsequent process step to reduce the pH by adding acid.

The amount of electrolytes added to the fluorescent material suspension is ideally adjusted within the range of 0.1 to 20 parts by weight of electrolyte to 100 parts by weight of fluorescent particles.

BRIEF DESCRIPTION OF THE DRAWINGS

FIG. 3 is a graph showing the relation between conductivity and open spot count for the present invention.

DETAILED DESCRIPTION OF THE INVENTION

In the present invention, an electrolytic material is attached to the surfaces of CRT fluorescent material particles for the purpose of forming uniform fluorescent coatings without open spots even when rapid drying is performed using high temperatures and bringing about more dispersion.

CRT fluorescent material with electrolytes attached to the fluorescent particle surfaces is manufactured as follows. This is a description of embodiments of the present invention with reference to the drawings.

Figure 1:
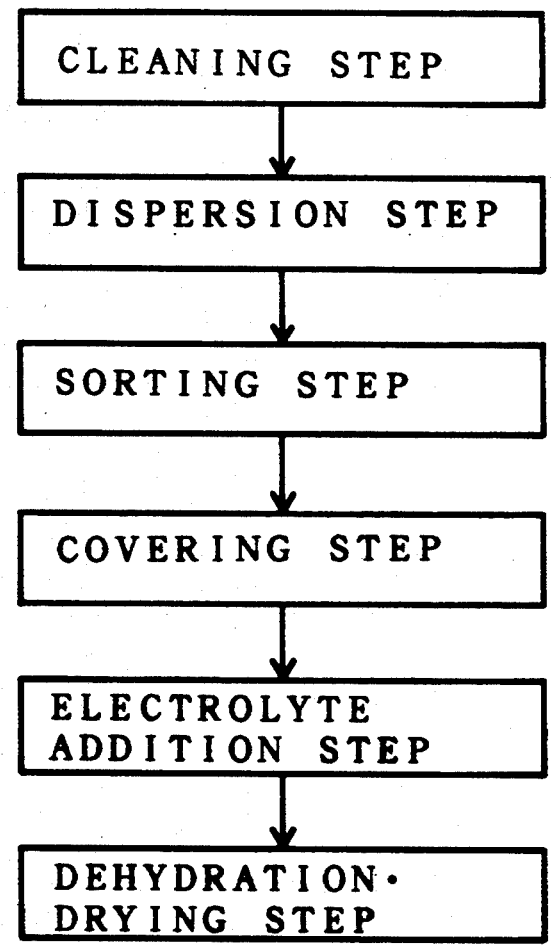
FIG. 1 is a flow-chart showing the process steps for manufacturing the CRT fluorescent material of the present invention.

The fluorescent material particles of the present invention can be either a mixture of fluorescent raw material which has been treated at high temperature (fired), or fluorescent material reclaimed by removing ammonium dichromate and other impurities from the effluent produced by the water cleaning development process following slurry method coating. FIG. 1 shows a process flow-chart of the finishing stages that attach electrolytic material to these types of fluorescent material particles.

As shown in FIG. 1, the finishing process is normally made up of a cleaning step in which the fluorescent material particles are water cleaned, a dispersion step in which the cleaned particles are dispersed by a suitable vibration means, a sorting step in which the dispersed particles are sorted out by a suitable sifting means, a covering step comprising a covering of SiO$_2$ micro-particles, and a dehydration and drying step for final dehydration and drying to produce the fluorescent material product in powder form. In this finishing process, the dispersion step after cleaning through the covering step may be omitted, as appropriate, for reclaimed material.

Of particular note in FIG. 1 is the electrolyte addition step between the covering step and the final dehydration and drying step. Restating this to include the case of reclaimed material, the electrolyte addition step is after the particles have gone through water cleaning and before the final dehydration and drying step. In this step, electrolytic solutions such as sulfates, nitrates, and chlorides of alkali metals (for example, Li, K, and Na) or alkaline-earth metals (for example, Ca, Sr, Ba, and Mg) are added to the fluorescent particle suspension with the supernatent liquid discarded. Electrolytes are added as an aqueous solution in a ratio of at least 0.1 parts by weight of electrolytic solution to 100 parts by weight of fluorescent material. This fluorescent material suspension is then slowly stirred.

Electrolytes, which are $K_2SO_4$, $Na_2SO_4$, LiCl, KCl, NaCl, etc., dissolved in water are preferable. From the particular embodiment presented later, the amount of additive is preferably 0.1 to 20 parts by weight of electrolyte to 100 parts by weight of fluorescent material. However, the accurate amount of electrolytic solution additive is such that the conductivity of the solution of suspended fluorescent material particles is adjusted to greater than or equal to 30 $\mu\Omega^{-1}\,cm^{-1}$ and preferably greater than or equal to 50 $\mu\Omega^{-1}\,cm^{-1}$. This conductivity measurement is made with a conductivity meter after stirring the added electrolytic solution with the fluorescent material. This conductivity value is that of the supernatent solution and is extremely easy to measure during production.

Another item of particular note is the desirability of oxidizing agent processing performed by addition of an oxidizing agent in the cleaning step. Namely, it is desirable to add an alkali hydroxide such as NaOH or KOH to the aqueous suspension of either heat-treated (fired) or reclaimed fluorescent particles after the water cleaning step. This addition is made in a ratio of 0.5 to 15 parts by weight of alkali hydroxide solution to 100 parts by weight of fluorescent material. The solution is heated to 75° C. to 80° C., and subsequently an oxidizing agent such as $H_2O_2$, NaClO, or $Na_2S_2O_8$ is added also approximately in the ratio of 0.5 to 15 parts by weight of oxidizing agent to 100 parts by weight of fluorescent material. The alkali hydroxide and oxidizing agent may be added simultaneously. Following this, an acid such as an organic acid is added to reduce the pH of the fluorescent material suspension.

Regardless of whether the electrolyte addition step is performed solely or in tandem with oxidizing agent processing in the cleaning step, a uniform fluorescent coating can be formed without open spots on a color Braun tube (CRT) even with high panel temperature processing. This is explained subsequently with reference to FIG. 2 and FIG. 3.

A 14 inch panel face-plate is used for open spot inspection. The method of omission inspection is as follows.

① The inner surface of the face-plate is pre-coated with a 0.1% solution of polyvinyl alcohol (PVA).
② The panel is heated to 59° C.
③ Fluorescent material particles are suspended in the usual slurry of PVA and ammonium dichromate photo-resist (ADC).
④ The inner surface of the face-plate is coated with this fluorescent material suspension (slurry).
⑤ In a dark room, a light source shines from the inner surface of the panel face-plate. The fluorescent coating is evaluated by collimating light from the outer surface of the panel face-plate.
⑥ For a uniform fluorescent coating, the entire screen is black. Anomalous regions such as thinly coated areas can be counted open spots.

Figure 2:
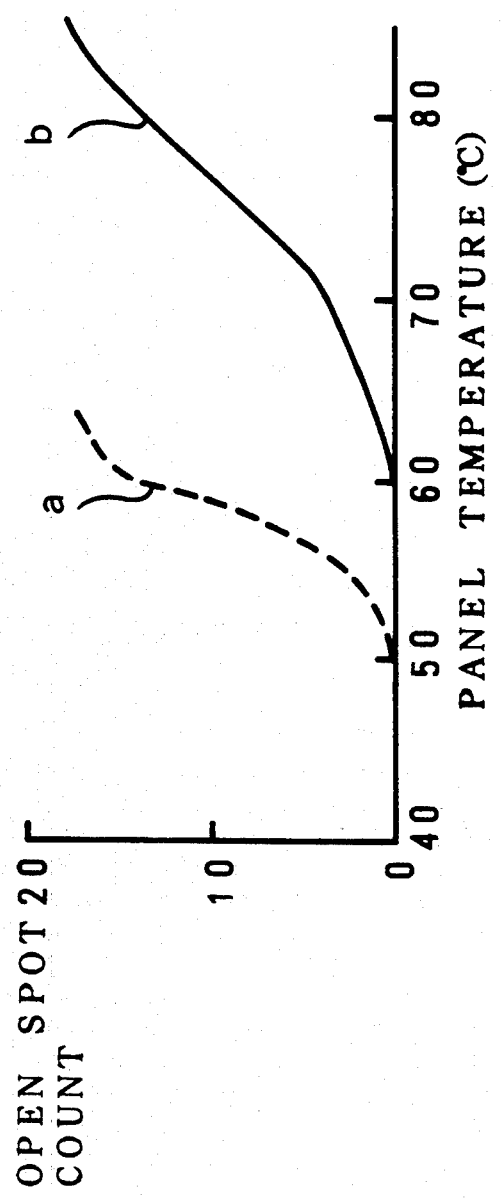
FIG. 2 is a graph showing the relation between panel temperature and open spot count compared with prior art.

Various experiments were performed using this type of open spot inspection. First, by changing panel temperature, the relation between average number of open spots and panel temperature, as shown in FIG. 2, was obtained. In FIG. 2, the dotted line (a) represents coatings of prior art fluorescent particles without the electrolyte addition step. The solid line (b) represents coatings of the present invention with the electrolyte addition step. From FIG. 2 it is clear that average open spot count rises for prior art coatings when panel temperature exceeds 50° C., while average open spot count rises when panel temperature exceeds 60° C. for coatings with fluorescent particles of the present invention which have gone through an electrolyte addition step.

Turning next to FIG. 3, the results of investigating average open spot count as a function of the conductivity of the fluorescent material suspension is shown. Fluorescent material suspension conductivity in this graph was measured as follows. 40 g of fluorescent material was added to 100 ml of pure water and stirred for 15 min. This fluorescent material suspension is allowed to sit, supernatant liquid is removed after the fluorescent particles sink, and the conductivity of the supernatant liquid is measured with a conductivity meter. In FIG. 3, the dotted line 1 is for coatings of fluorescent material particles with only the electrolyte addition step performed and without oxidizing agent processing in the cleaning step. The solid line 2 is for coatings of fluorescent material particles with both the electrolyte addition step performed and with oxidizing agent processing in the cleaning step. From FIG. 3 it is clear that compared to coatings of fluorescent material particles with no electrolyte addition step that produce an average open spot count greater than 20, open spot counts for coatings of fluorescent particles with an electrolyte addition step drop suddenly near a conductivity of 30 $\mu\Omega^{-1}\,cm^{-1}$. After this sudden drop, open spot counts are down to about 3 for the electrolyte addition step only case, and down to about 0.5 for the electrolyte addition step plus oxidizing agent processing case when conductivity is near 50 $\mu\Omega^{-1}\,cm^{-1}$.

The following describes specific embodiments of the present invention.

One kilogram of zinc sulfide family green light emitting fluorescent material which has completed normal heat treatment processing (firing) is added to five liters of pure water. After sufficient stirring, the fluorescent material is allowed to sink, and the supernatant liquid is removed. This operation is repeated 5 to 7 times to water clean the fluorescent material thus performing the cleaning step.

Next, after performing the normal processing steps of dispersion, sorting, and covering, electrolytic material is attached to the fluorescent particles in the electrolyte addition step. In the electrolyte addition step, electrolytes are added to the fluorescent material suspension. 5 g, 15 g, and 50 g of $Na_2SO_4$ (embodiments 1, 2, and 3); 20 g of NaCl (embodiment 4); 15 g of $K_2SO_4$ (embodiment 5); and 20 g of KCl (embodiment 6) dissolved in suitable amounts of pure water are used as electrolytic material. Each of these electrolytes are added to a fluorescent material suspension and slowly stirred. Subsequently, processing of the fluorescent material is finished with the normal dehydration and drying step.

The comparison fluorescent material 1 (comparison 1) is processed the same as embodiment 1 except that no electrolytic material is attached to the fluorescent particle surfaces. Table 1 shows the supernatant liquid conductivity and panel fluorescent coating open spot count for comparison material 1 and embodiments 1 through 6.

moved. Next with five liters of pure water, stirring and decanting is performed six times. The cleaning step is completed by verifying that the pit of the supernatant

TABLE 1

|  | Comparison 1 | Embodiment 1 | Embodiment 2 | Embodiment 3 | Embodiment 4 | Embodiment 5 | Embodiment 6 |
| --- | --- | --- | --- | --- | --- | --- | --- |
| Fluorescent Material | Green (fired) | Green (fired) | Green (fired) | Green (fired) | Green (fired) | Green (fired) | Green (fired) |
| Electrolyte (/Kg) |  | $Na_2SO_4$ 5 g | $Na_2SO_4$ 15 g | $Na_2SO_4$ 50 g | NaCl 20 g | $K_2SO_4$ 15 g | KCl 20 g |
| Conductivity ($\mu\Omega^{-1}cm^{-1}$) | 20 | 200 | 620 | 1360 | 550 | 400 | 630 |
| Open Spot Count | 15 | 3 | 1 | 0 | 2 | 3 | 2 |

Different from embodiments 1 through 6, Table 2 shows the results of performing the electrolyte addition step for zinc sulfide family blue light emitting fluorescent material and yttrium sulfate family red light emitting fluorescent material as well as comparison materials 2 and 3 with no electrolyte addition step.

liquid is greater than or equal to 4.7.

After performing normal dispersion, sorting, and covering steps, 15 g of $Na_2SO_4$ is dissolved in an appropriate amount of water and added to the fluorescent material particles with the supernatant removed. The aqueous solution is slowly stirred and the preparation

TABLE 2

|  | Embodiment 7 | Embodiment 8 | Embodiment 9 | Embodiment 10 | Comparasion 2 | Comparison 3 |
| --- | --- | --- | --- | --- | --- | --- |
| Fluorescent Material | Blue (fired) | Blue (fired) | Red (fired) | Red (fired) | Blue (fired) | Red (fired) |
| Electrolyte (/Kg) | $Na_2SO_4$ 15 g | KCl 20 g | $Na_2SO_4$ 15 g | $K_2SO_4$ 20 g |  |  |
| Conductivity ($\mu\Omega^{-1}cm^{-1}$) | 600 | 600 | 570 | 660 | 19 | 27 |
| Open Spot Count | 1 | 2 | 0 | 1 | 18 | 20 |

Embodiments with oxidizing agent processing during the cleaning step are discussed next. Three liters of pure water are added to 1 kg of zinc sulfide family green light emitting fluorescent material and 50 g of NaOH is added while stirring the solution. This suspended solution is heated to 75° C. to 80° C. and 50 g of $Na_2S_2O_8$ is added while maintaining a temperature of 75° C. to 80° C. and stirring for one hour. After allowing sediment to settle and removing the supernatant liquid, three liters of pure water are again added and the pH of the solution is reduced to 4.2 by dripping in acetic acid while stirring. After approximately 5 min of stirring, the solution is allowed to settle and the supernatant liquid is reprocess is finished with the usual dehydration and drying step.

Table 3 and table 4 show the results of this embodiment 11 and embodiments 12 through 18 in which the type of fluorescent material, oxidizing agent, electrolytic solution, and quantities are varied.

TABLE 3

|  | Embodiment 11 | Embodiment 12 | Embodiment 13 | Embodiment 14 |
| --- | --- | --- | --- | --- |
| Fluorescent Material | Green (fired) | Green (fired) | Green (fired) | Green (fired) |
| Alkali Hydroxide (/Kg) | NaOH 50 g | NaOH 20 g | NaOH 20 g | NaOH 50 g |
| Oxidizing Agent (/Kg) | $Na_2S_2O_8$ 50 g | 35% $H_2O_2$ 80 ml | 50% NaClO 500 ml | $Na_2S_2O_8$ 50 g |
| Electrolyte (/Kg) | $Na_2SO_4$ 15 g | $Na_2SO_4$ 15 g | $Na_2SO_4$ 15 g | $K_2SO_4$ 5 g |
| Conductivity ($\mu\Omega^{-1}cm^{-1}$) | 580 | 570 | 550 | 180 |
| Open Spot Count | 0 | 0 | 0 | 0 |

|  | Embodiment 15 | Embodiment 16 | Embodiment 17 | Embodiment 18 |
| --- | --- | --- | --- | --- |
| Fluorescent Material | Blue (fired) | Blue (fired) | Red (fired) | Red (fired) |
| Alkali Hydroxide (/Kg) | NaOH 50 g | NaOH 20 g | NaOH 50 g | NaOH 30 g |
| Oxidizing Agent (/Kg) | $Na_2S_2O_8$ 50 g | 35% $H_2O_2$ 100 ml | $Na_2S_2O_8$ 50 g | 50% NaClO 600 ml |
| Electrolyte (/Kg) | $Na_2SO_4$ 15 g | NaCl 10 g | $Na_2SO_4$ 15 g | KCl 20 g |
| Conductivity ($\mu\Omega^{-1}cm^{-1}$) | 550 | 300 | 590 | 530 |
| Open Spot Count | 0 | 0 | 0 | 0 |

Table 5 and Table 6 show embodiments using fluorescent particles reclaimed during coating in the slurry method as well as comparison examples 4 through 6 with no electrolyte addition step.

TABLE 5

|  | Embodiment 19 | Embodiment 20 | Embodiment 21 |
|---|---|---|---|
| Fluorescent Material | Green (reclaimed) | Green (reclaimed) | Blue (reclaimed) |
| Alkali Hydroxide (/Kg) | NaOH 50 g | NaOH 50 g | NaOH 50 g |
| Oxidizing Agent (/Kg) | $Na_2S_2O_8$ 50 g | $Na_2S_2O_8$ 50 g | $Na_2S_2O_8$ 50 g |
| Electrolyte (/Kg) | $Na_2SO_4$ 15 g | KCl 5 g | $Na_2SO_4$ 20 g |
| Conductivity ($\mu\Omega^{-1}cm^{-1}$) | 590 | 190 | 700 |
| Open Spot Count | 0 | 0 | 0 |

TABLE 6

|  | Embodiment 22 | Embodiment 23 | Embodiment 24 |
|---|---|---|---|
|  | Blue (reclaimed) | Red (reclaimed) | Red (reclaimed) |
|  | NaOH | NaOH | NaOH |
|  | 30 g | 50 g | 30 g |
|  | 35% $H_2O_2$ 80 ml | $Na_2S_2O_8$ 50 g | 50% NaClO 700 ml |
|  | NaCl 5 g | $Na_2SO_4$ 15 g | $K_2SO_4$ 20 g |
|  | 170 | 600 | 650 |
|  | 0 | 0 | 0 |

Although the electrolyte addition step has been described separately from the $SiO_2$ covering step, it should be clear that the electrolyte addition step may be performed during, or simultaneous with the covering step to the extent that there is no deviation from the basic intent of the present invention.

The CRT fluorescent material of the present invention, produced by the above mentioned process steps, has fluorescent function and can form a uniform fluorescent CRT face-plate coating even when dried at high panel temperatures between 55° C. to 60° C. These fluorescent particles with modified surface properties can be obtained by a simple method of adding an electrolytic solution, such as $Na_2SO_4$ or $K_2SO_4$, followed by dehydration and drying.

What is claimed is:

1. A method of manufacturing cathode-ray tube fluorescent material, which comprises adding an electrolyte selected from the group consisting of alkali metal sulfates, alkali metal nitrates, alkali metal chlorides, alkaline earth metal nitrates and alkaline earth metal chlorides to a liquid suspension including fluorescent material particles, which have gone through a cleaning step; wherein the electrolyte is added to the liquid suspension in an amount to produce a supernatant liquid having a conductivity greater than or equal to 50 $\mu\Omega^{-1} cm^{-1}$; and wherein the liquid suspension is subsequently dehydrated and dried to attach electrolytic material to surfaces of the fluorescent material particles.

2. A method of manufacturing cathode-ray tube fluorescent material as recited in claim 1 wherein the amount of electrolyte added to the liquid suspension is adjusted to make the conductivity of the supernatant liquid greater than or equal to 170 $\mu\Omega^{-1}cm^{-1}$.

3. A method of manufacturing cathode-ray tube fluorescent material as recited in claim 1 wherein the amount of electrolyte added is 0.1 to 20 parts by weight to 100 parts by weight of fluorescent material particles.

4. A method of manufacturing cathode-ray tube fluorescent material as recited in claim 1 wherein the electrolytic material is $K_2SO_4$.

5. A method of manufacturing cathode-ray tube fluorescent material as recited in claim 1 wherein the electrolytic material is $Na_2SO_4$.

6. A method of manufacturing cathode-ray tube fluorescent material as recited in claim 1 wherein the electrolytic material is KCl.

7. A method of manufacturing cathode-ray tube fluorescent material as recited in claim 1 wherein the electrolytic material is NaCl.

8. A method of manufacturing cathode-ray tube fluorescent material, which comprises adding an electrolyte selected from the group consisting of alkali metal sulfates, alkali metal nitrates, alkali metal chlorides, alkaline earth metal nitrates and alkaline earth metal chlorides to a liquid suspension including fluorescent material particles, which have gone through a cleaning step which includes adding an alkali hydroxide and oxidizing agent to a suspension of the fluorescent material particles followed by adding an acid to reduce the pH of the suspension; wherein the electrolyte is added to the liquid suspension in an amount to produce a supernatant liquid having a conductivity greater than or equal to 50 $\mu\Omega^{-1}cm^{-1}$; and wherein the liquid suspension is subsequently dehydrated and dried to attach electrolytic material to surfaces of the fluorescent material particles.

9. A method of manufacturing cathode-ray tube fluorescent material as recited in claim 8 wherein the amount of alkali hydroxide added is 0.5 to 15 parts by weight to 100 parts by weight of fluorescent material particles.

10. A method of manufacturing cathode-ray tube fluorescent material as recited in claim 8 wherein the alkali hydroxide is NaOH.

11. A method of manufacturing cathode-ray tube fluorescent material as recited in claim 8 wherein the alkali hydroxide is KOH.

12. A method of manufacturing cathode-ray tube fluorescent material as recited in claim 8 wherein the oxidizing agent is $H_2O_2$.

13. A method of manufacturing cathode-ray tube fluorescent material as recited in claim 8 wherein the oxidizing agent is NaClO.

14. A method of manufacturing cathode-ray tube fluorescent material as recited in claim 8 wherein the oxidizing agent is $Na_2S_2O_8$.

15. A method of manufacturing cathode-ray tube fluorescent material as recited in claim 8 wherein the amount of electrolyte added to the liquid suspension is adjusted to make the conductivity of the supernatant liquid greater than or equal to 170 $\mu\Omega^{-1}cm^{-1}$.

16. A method of manufacturing cathode-ray tube fluorescent material as recited in claim 8 wherein the amount of electrolyte added is 0.1 to 20 parts by weight to 100 parts by weight of fluorescent material particles.

17. A method of manufacturing cathode-ray tube fluorescent material as recited in claim 8 wherein the electrolytic material is $K_2SO_4$.

18. A method of manufacturing cathode-ray tube fluorescent material as recited in claim 8 wherein the electrolytic material is $Na_2SO_4$.

19. A method of manufacturing cathode-ray tube fluorescent material as recited in claim 8 wherein the electrolytic material is KCl.

20. A method of manufacturing cathode-ray tube fluorescent material as recited in claim 8 wherein the electrolytic material is NaCl.

* * * * *